US006946145B2

(12) United States Patent
Ng et al.

(10) Patent No.: US 6,946,145 B2
(45) Date of Patent: Sep. 20, 2005

(54) BLOCK COPOLYMERS BASED ON POLY (ORTHO ESTERS) CONTAINING AMINE GROUPS

(75) Inventors: Steven Y. Ng, San Francisco, CA (US); Jorge Heller, Woodside, CA (US)

(73) Assignee: A.P. Pharma, Inc., Redwood City, CA (US)

( * ) Notice: Subject to any disclaimer, the term of this patent is extended or adjusted under 35 U.S.C. 154(b) by 56 days.

(21) Appl. No.: 10/627,297

(22) Filed: Jul. 24, 2003

(65) Prior Publication Data

US 2004/0146550 A1 Jul. 29, 2004

Related U.S. Application Data

(60) Division of application No. 10/295,766, filed on Nov. 14, 2002, now Pat. No. 6,667,371, which is a continuation-in-part of application No. 09/991,537, filed on Nov. 16, 2001, now Pat. No. 6,524,606.

(51) Int. Cl.[7] .......................... A61K 9/52; A61K 47/30
(52) U.S. Cl. .................... 424/457; 424/78.05; 424/469; 424/477; 424/482; 514/772.3; 514/773; 514/785; 514/816; 514/817; 514/887
(58) Field of Search .............................. 424/457, 469, 424/477, 482, 78.05; 514/772.3, 773, 785, 816, 817, 887

(56) References Cited

U.S. PATENT DOCUMENTS

| | | | | |
|---|---|---|---|---|
| 3,268,550 | A | 8/1966 | Heller | 260/315 |
| 4,014,987 | A | 3/1977 | Heller et al. | 424/15 |
| 4,079,038 | A | 3/1978 | Choi et al. | 260/47 XA |
| 4,093,709 | A | 6/1978 | Choi et al. | 424/19 |
| 4,131,648 | A | 12/1978 | Choi et al. | 424/22 |
| 4,138,344 | A | 2/1979 | Choi et al. | 252/1 |
| 4,180,064 | A | 12/1979 | Heller et al. | 128/130 |
| 4,180,646 | A | 12/1979 | Choi et al. | 528/153 |
| 4,249,531 | A | 2/1981 | Heller et al. | 128/260 |
| 4,261,969 | A | 4/1981 | Heller | 424/19 |
| 4,304,767 | A | 12/1981 | Heller et al. | 424/78 |
| 4,502,976 | A | 3/1985 | Heller | 252/315.4 |
| 4,513,143 | A | 4/1985 | Ng et al. | 549/335 |
| 4,532,335 | A | 7/1985 | Helwing | 549/335 |
| 4,548,990 | A | 10/1985 | Mueller et al. | 525/123 |
| 4,549,010 | A | 10/1985 | Sparer et al. | 528/361 |
| 4,590,190 | A | 5/1986 | Saito et al. | 514/221 |
| 4,605,670 | A | 8/1986 | Saito et al. | 514/619 |
| 4,639,366 | A | 1/1987 | Heller | 424/19 |
| 4,690,682 | A | 9/1987 | Lim | 604/891 |
| 4,690,825 | A | 9/1987 | Won | 424/501 |
| 4,710,497 | A | 12/1987 | Heller et al. | 514/221 |
| 4,713,441 | A | 12/1987 | Heller et al. | 528/392 |
| 4,738,932 | A | 4/1988 | Yabusaki | 436/511 |
| 4,745,160 | A | 5/1988 | Churchill et al. | 525/415 |
| 4,752,612 | A | 6/1988 | Saito et al. | 514/420 |
| 4,764,364 | A | 8/1988 | Heller et al. | 424/78 |
| 4,765,973 | A | 8/1988 | Heller | 424/486 |
| 4,801,457 | A | 1/1989 | Heller et al. | 424/422 |
| 4,806,360 | A | 2/1989 | Leong et al. | 424/487 |
| 4,818,542 | A | 4/1989 | DeLuca et al. | 424/491 |
| 4,849,426 | A | 7/1989 | Pearlman | 514/274 |
| 4,855,132 | A | 8/1989 | Heller et al. | 424/78 |
| 4,855,144 | A | 8/1989 | Leong et al. | 424/487 |
| 4,898,928 | A | 2/1990 | Heller et al. | 528/392 |
| 4,923,645 | A | 5/1990 | Tsang et al. | 264/4.3 |
| 4,938,763 | A | 7/1990 | Dunn et al. | 604/891.1 |
| 4,946,931 | A | 8/1990 | Heller et al. | 528/230 |
| 4,957,998 | A | 9/1990 | Heller et al. | 528/220 |
| 4,963,369 | A | 10/1990 | Song et al. | 426/5 |
| 5,013,553 | A | 5/1991 | Southard et al. | 424/426 |
| 5,013,821 | A | 5/1991 | Heller et al. | 528/376 |
| 5,028,435 | A | 7/1991 | Katz et al. | 424/484 |
| 5,030,457 | A | 7/1991 | Ng et al. | 424/486 |
| 5,047,464 | A | 9/1991 | Pogany et al. | 524/500 |
| 5,077,049 | A | 12/1991 | Dunn et al. | 424/426 |
| 5,108,755 | A | 4/1992 | Daniels et al. | 424/426 |
| 5,128,376 | A | 7/1992 | Saito et al. | 514/772 |
| 5,135,740 | A | 8/1992 | Katz et al. | 424/401 |
| 5,145,675 | A | 9/1992 | Won | 424/78.31 |
| 5,188,844 | A | 2/1993 | Ahene et al. | 424/874 |
| 5,217,712 | A | 6/1993 | Pogany et al. | 424/78.18 |
| 5,240,715 | A | 8/1993 | Ahene et al. | 424/574 |
| 5,256,400 | A | 10/1993 | Froix et al. | 424/45 |
| 5,261,169 | A | 11/1993 | Williford | 36/43 |
| 5,278,201 | A | 1/1994 | Dunn et al. | 523/113 |
| 5,316,774 | A | 5/1994 | Eury et al. | 424/501 |
| 5,324,519 | A | 6/1994 | Dunn et al. | 424/426 |

(Continued)

FOREIGN PATENT DOCUMENTS

| | | |
|---|---|---|
| DE | 0291668 | 7/1991 |
| DE | 4415204 | 11/1995 |
| EP | 0322392 | 6/1989 |
| EP | 0419156 | 3/1991 |
| EP | 0466566 | 1/1992 |

(Continued)

OTHER PUBLICATIONS

Andriano et al., "Preliminary effects of in vitro lipid exposure on absorbable poly(ortho ester) films," *J Appl Biomater.* 6(2):129–35 (1995).

Ashford et al., "An evaluation of pectin as a carrier for drug targeting to the colon," *Chemical Abstracts* 119:278554r (1993) pp. 514.

(Continued)

*Primary Examiner*—Samuel A. Acquah
(74) *Attorney, Agent, or Firm*—Heller Ehrman White & McAuliffe LLP

(57) ABSTRACT

Block copolymers based on poly(ortho esters) containing amine groups. These block copolymers have both hydrophilic and hydrophobic blocks. They form micelles in aqueous solution, making them suitable for encapsulation or solubilization of hydrophobic or water-insoluble materials; and they also form bioerodible matrices for the sustained release of active agents.

16 Claims, No Drawings

U.S. PATENT DOCUMENTS

| | | |
|---|---|---|
| 5,324,520 A | 6/1994 | Dunn et al. ............... 424/435 |
| 5,334,640 A | 8/1994 | Desai et al. ............... 524/56 |
| 5,336,505 A | 8/1994 | Ng et al. ............... 424/486 |
| 5,340,849 A | 8/1994 | Dunn et al. ............... 523/113 |
| 5,368,859 A | 11/1994 | Dunn et al. ............... 424/426 |
| 5,407,609 A | 4/1995 | Tice et al. ............... 264/46 |
| 5,422,121 A | 6/1995 | Lehmann et al. ............... 424/464 |
| 5,449,670 A | 9/1995 | Skinner et al. ............... 514/3 |
| 5,458,890 A | 10/1995 | Williford et al. ............... 426/3 |
| 5,461,140 A | 10/1995 | Heller et al. ............... 528/425 |
| 5,487,897 A | 1/1996 | Polson et al. ............... 424/426 |
| 5,505,966 A | 4/1996 | Edman et al. ............... 424/493 |
| 5,510,116 A | 4/1996 | Froix et al. ............... 424/486 |
| 5,518,730 A | 5/1996 | Fuisz ............... 424/426 |
| 5,525,634 A | 6/1996 | Sintov et al. ............... 514/77 |
| 5,540,912 A | 7/1996 | Roorda et al. ............... 424/426 |
| 5,599,552 A | 2/1997 | Dunn et al. ............... 424/423 |
| 5,605,933 A | 2/1997 | Duffy et al. ............... 514/557 |
| 5,607,686 A | 3/1997 | Totakura et al. ............... 424/426 |
| 5,620,697 A | 4/1997 | Tormala et al. ............... 424/426 |
| 5,627,187 A | 5/1997 | Katz ............... 514/274 |
| 5,632,727 A | 5/1997 | Tipton et al. ............... 602/47 |
| 5,660,849 A | 8/1997 | Polson et al. ............... 424/426 |
| 5,681,873 A | 10/1997 | Norton et al. ............... 523/115 |
| 5,702,716 A | 12/1997 | Dunn et al. ............... 424/422 |
| 5,725,491 A | 3/1998 | Tipton et al. ............... 602/43 |
| 5,733,950 A | 3/1998 | Dunn et al. ............... 523/113 |
| 5,739,176 A | 4/1998 | Dunn et al. ............... 523/113 |
| 5,744,153 A | 4/1998 | Yewey et al. ............... 424/426 |
| 5,759,563 A | 6/1998 | Yewey et al. ............... 424/426 |
| 5,780,044 A | 7/1998 | Yewey et al. ............... 424/426 |
| 5,783,205 A | 7/1998 | Berggren et al. ............... 424/426 |
| 5,792,469 A | 8/1998 | Tipton et al. ............... 424/422 |
| 5,824,343 A | 10/1998 | Ng et al. ............... 424/486 |
| 5,837,228 A | 11/1998 | Shih et al. ............... 424/78.37 |
| 5,840,293 A | 11/1998 | Nacht et al. ............... 424/78.02 |
| 5,849,327 A | 12/1998 | Berliner et al. ............... 424/463 |
| 5,851,538 A | 12/1998 | Froix et al. ............... 424/401 |
| 5,871,722 A | 2/1999 | Nacht et al. ............... 424/78.03 |
| 5,879,716 A | 3/1999 | Katz et al. ............... 424/501 |
| 5,891,470 A | 4/1999 | Rinaldi et al. ............... 424/451 |
| 5,916,597 A | 6/1999 | Lee et al. ............... 424/501 |
| 5,939,453 A | 8/1999 | Heller et al. ............... 260/47 XA |
| 5,945,115 A | 8/1999 | Dunn et al. ............... 424/422 |
| 5,955,109 A | 9/1999 | Won et al. ............... 424/501 |
| 5,968,543 A | 10/1999 | Heller et al. ............... 424/425 |
| 5,990,194 A | 11/1999 | Dunn et al. ............... 523/113 |
| 5,993,856 A | 11/1999 | Ragavan et al. ............... 424/489 |
| 6,007,845 A | 12/1999 | Domb et al. ............... 424/501 |
| 6,071,530 A | 6/2000 | Polson et al. ............... 424/426 |
| 6,083,521 A | 7/2000 | Acemoglu et al. ............... 424/422 |
| 6,096,344 A | 8/2000 | Liu et al. ............... 424/501 |
| 6,143,314 A | 11/2000 | Chandrashekar et al. ... 424/426 |
| 6,159,491 A | 12/2000 | Durrani ............... 424/430 |
| 6,166,173 A | 12/2000 | Mao et al. ............... 528/398 |
| 6,193,991 B1 | 2/2001 | Shukla ............... 424/426 |
| 6,206,920 B1 | 3/2001 | Eliaz et al. ............... 623/16.11 |
| 6,217,895 B1 | 4/2001 | Guo et al. ............... 424/427 |
| 6,238,705 B1 | 5/2001 | Liu et al. ............... 424/501 |
| 6,245,345 B1 | 6/2001 | Swanbom et al. ............... 424/402 |
| 6,261,583 B1 | 7/2001 | Dunn et al. ............... 424/422 |
| 6,262,127 B1 | 7/2001 | Acemoglu et al. ............... 514/772.7 |
| 6,281,015 B1 | 8/2001 | Mooney et al. ............... 435/395 |
| 6,287,588 B1 | 9/2001 | Shih et al. ............... 424/426 |
| 6,331,311 B1 | 12/2001 | Brodbeck et al. ............... 424/425 |
| 6,372,245 B1 | 4/2002 | Bowman et al. ............... 424/427 |
| 6,395,293 B2 | 5/2002 | Polson et al. ............... 424/426 |
| 6,524,606 B1 | 2/2003 | Ng et al. ............... 424/426 |
| 6,590,059 B2 | 7/2003 | Ng et al. ............... 528/220 |
| 6,613,355 B2 | 9/2003 | Ng et al. ............... 424/462 |

| | | |
|---|---|---|
| 2002/0037300 A1 | 3/2002 | Ng et al. |

FOREIGN PATENT DOCUMENTS

| | | |
|---|---|---|
| EP | 0485840 | 5/1992 |
| EP | 0524831 | 1/1993 |
| EP | 0471036 | 1/1996 |
| EP | 1142596 | 10/2001 |
| FR | 2238477 | 2/1975 |
| FR | 2352547 | 12/1977 |
| GB | 1482663 | 8/1977 |
| GB | 1579490 | 11/1980 |
| JP | 2218719 | 8/1990 |
| JP | 3000732 | 1/1991 |
| JP | 3005419 | 1/1991 |
| WO | 8703692 | 6/1987 |
| WO | 8801164 | 2/1988 |
| WO | 8910132 | 11/1989 |
| WO | 8910818 | 11/1989 |
| WO | 8910947 | 11/1989 |
| WO | 9012605 | 11/1990 |
| WO | 9013361 | 11/1990 |
| WO | 9103510 | 3/1991 |
| WO | 9104732 | 4/1991 |
| WO | 9107101 | 5/1991 |
| WO | 9117738 | 11/1991 |
| WO | 9200732 | 1/1992 |
| WO | 9218222 | 1/1992 |
| WO | 9202210 | 2/1992 |
| WO | 9300383 | 1/1993 |
| WO | 9306757 | 4/1993 |
| WO | 9307862 | 4/1993 |
| WO | 03044446 | 5/1993 |
| WO | 9310826 | 6/1993 |
| WO | 9325077 | 12/1993 |
| WO | 9414417 | 7/1994 |
| WO | 9516659 | 6/1995 |
| WO | 9632419 | 10/1996 |
| WO | 9720812 | 6/1997 |
| WO | WO 97/25366 | 7/1997 |
| WO | 9725980 | 7/1997 |
| WO | 9727843 | 8/1997 |
| WO | 9739746 | 10/1997 |
| WO | 9953904 | 10/1999 |
| WO | WO 99/62983 | 12/1999 |
| WO | 0000159 | 1/2000 |
| WO | 0115734 | 3/2001 |
| WO | 0135929 | 5/2001 |
| WO | 0174411 | 10/2001 |
| WO | 0185139 | 11/2001 |
| WO | 0220663 | 3/2002 |
| WO | 02092061 | 11/2002 |
| WO | 02092655 | 11/2002 |
| WO | 02092661 | 11/2002 |

OTHER PUBLICATIONS

Barr et al. "Post surgical pain management with poly(ortho esters)," *Adv Drug Deliv Rev.* 54(7):1041–8 (2002).

Bernatchez et al. "Biotolerance of a semisolid hydrophobic biodegradable poly(ortho ester) for controlled drug delivery," *J Biomed Mater Res.* 27(5):677–81 (1993).

Beyerstedt et al., "The Preparation And Properties of Ketene Diethylacetal", J. Amer. Chem. Soc., 58, 529–531 (1936).

Castillo et al. "*Glucocorticoids Prolong Rat Sciatic Nerve Blockade* In Vivo *from Bupivacine Microspheres*," *Anesthesiology* 85(3):1157–1166 (1996).

Chia et al. "Auto–catalyzed poly(ortho ester) microspheres: a study of their erosion and drug release mechanism," *J Control Release.* 75(1–2):11–25 (2001).

*Contemporary Polymer Chemistry 3rd Ed*. Allcock et al. (eds.) Upper Saddle River, New Jersey: Pearson Education, Inc. Ch. 1 pp. 11–12 (2003).

Corey et al., "Selective Cleavage of Allyl Ethers under Mild Conditions by Transition Metal Regents", *J. Org. Chem.*, 38(18):3224 (1973).

Dahl JB et al. "Wound inflation with local anaesthetics for postoperative pain relief," *Acta Anaesthesiol Scand* 38:7–14 (1994).

Derwent Abstract, Accession No. 10473386 for German Patent Application DE 4415204 published Nov. 2, 1995, "Compsns contg retinyl salicylate or acetyl–salicylate—for pharmaceutical or cosmetic treatment of inflammation, general necrosis, intoxication, allergies, tumours, ect.".

Derwent Abstract, Accession No. 15388893 for PCT Patent Publication WO 200344446 published May 30, 2003, "Disposal of materials containing high–energy substances, expecially shells, comprises recycling bulk material leaving a fluidized bed in a non–cooled state to a different inlet region that the materials for disposal".

Derwent Abstract, Accession No. 8850667 for German Patent Application DD 291668 A published Jul. 11, 1991, "GnRH prepn. for oral use—consist of GNRH nucleus contg. detergent to promote resorption, inner coating which dissolves in the colon and outer coating".

Derwent Abstract, Accession No. 3209328 for Japanese Patent Application JP 2218719 published Aug. 31, 1990 and JP 300732 published Jan. 7, 1991, "Biodegradable polymers from polyol and ketene acetal—useful for making implants for delivering pharmaceuticals et al."

Derwent Abstract, Accession No. 8469383 for Japanese Patent application 3005419 published Jan. 11, 1991, "New percutaneous rate controlled delivery system—comprising drug, penetration enhancer and polymeric particles in a matrix layer".

Deshpande et al. "Bioerodible polymers for ocular drug delivery," *Crit Rev Ther Drug Carrier Syst.* 15(4):381–420 (1998).

Dräger et al., "Prolonged Intercostal Nerve Blockade in Sheep Using Controlled–release of Bupivacaine and Dexamethasone from Polymer Microspheres," *Anesthesiology* 89(4):969–979 (1998).

Duenas et al., "Sustained Delivery of rhVEGF from a Novel injectable Liquid, PLAD," *Proceed. Int'l Symp. Control Rel. Bioact. Mater.* 28:1041–1042 (2001).

Einmahl et al., "A viscous bioerodible poly(ortho ester) as a new biomaterial for intraocular application," *J Biomed Mater Res.* 50(4):566–73 (2000).

Einmahl et al., "Concomitant and controlled release of dexamethasone and 5–fluorouracil from poly(ortho ester)," *Int J Pharm.* 185(2):189–98 (1999).

Geary et al., "Vancomycin and insulin used as models for oral delivery of peptides," *J of Controlled Release* 23:65–74 (1993).

Heller et al.,"Controlled drug release from bioerodible hydrophobic ointments," *Biomaterials.* 11(4):235–7 (1990).

Heller et al.,"Controlled release of water–soluble macromolecules from bioerodible hydrogels," *Biomaterials.* 4(4):262–6 (1983).

Heller et al., "Controlled drug release by polymer dissolution. II: Enzyme–mediated delivery device," *J Pharm Sci.* 68(7):919–21 (1979).

Heller et al., "Poly(ortho ester) biodegradable polymer systems," *Methods Enzymol.* 112:422–36 (1985).

Heller et al. "Controlled release of contraceptive steroids from biodegradable poly (ortho esters)," *Contracept Deliv Syst.* 4(1):43–53 (1983).

Heller et al. Erratum to "Poly(ortho esters)—their development and some recent applications," *Eur J Pharm Biopharm.* 50(1):121–8. (2000) Review. Erratum in: Eur J Pharm Biopharm Sep. 2000;50(2):327.

Heller et al. "Development and applications of injectable poly(ortho esters) for pain control and periodontal treatment," *Biomaterials* 23(22):4397–404 (2002).

Heller J., "Controlled drug release from poly(ortho esters)," *Ann N Y Acad Sci.* 446:51–66 (1985).

Heller J., "Modulated release from drug delivery devices," *Crit Rev Ther Drug Carrier Syst.* 10(3):253–305 (1993).

Heller et al. "Poly(ortho esters): synthesis, characterization, properties and uses," *Adv Drug Deliv Rev.* 54(7):1015–39 (2002).

Heller J., "Controlled release of biologically active compounds from bioerodible polymers," *Biomaterials.* 1(1):51–7 (1980).

Heller J., "The use of polymers in the construction of controlled–release devices," *NIDA Res Monogr.* 154:107–31 (1995).

Heller J., "Biodegradable polymers in controlled drug delivery," *Crit Rev Ther Drug Carrier Syst.* 1(1):39–90 (1993).

Heller J., "Preparation of Polyacetals by the Reaction of Divinyl Ethers and Polyols"; J. Polymer Sci. Polymer Letters Ed., 18,293–297 (1980).

Kipper et al., "Design of an Injectable system based on bioerodible polyanhydride microspheres for sustained drug delivery" *Biomaterials* 23:4405–4412 (2002).

Leadley et al., "The use of SIMS, XPS and in situ AFM to probe the acid catalysed hydrolysis of poly(orthoesters)," *Biomaterials.* 19(15):1353–60 (1998).

Merkli et al.,"Synthesis and characterization of a new biodegradable semi–solid poly(ortho ester) for drug delivery systems," *J Biomater Sci Polym Ed.* 4(5):505–16 (1993).

Merkli et al.,"Gamma sterilization of a semi–solid poly-(ortho ester) designed for controlled drug delivery—validation and radiation effects," *Pharm Res.* 11(10):1485–91 (1994).

Merkli et al., "Purity and stability assessment of a semi–solid poly(ortho ester) used in drug delivery systems," *Biomaterials.* 17(9):897–902 (1996).

Milojevic et al., "Amylose as a coating for drug delivery to the colon: preparation and vitro evaluation using 5–aminosalicylic acid pellets," *J of Controlled Release* 38:75–84 (1996).

Ng et al., "Development of a poly(ortho ester) prototype with a latent acid in the polymer backbone for 5–fluorouracil delivery," *J. Control Release* 65:367–74 (2000).

Ng et al., "Controlled drug release from self–catalyzed poly(ortho esters)," *Ann N Y Acad Sci.* 831:168–78 (1997).

Okumu et al., "Sustained Delivery of Growth Hormone from a Novel Injectable Liquid, PLAD," *Proceed. Int'l Symp. Control Rel. Bioact. Mater.* 28:1029–1030 (2001).

Press Release: "Advanced Polymer Systems Granted Two Composition of Matter Patents Related to its Bioerodible Polymer Technology," Advanced Polymer Systems News Release, Oct. 1999.

Roberts et al., "The Role of Neighboring Groups in Replacement Reactions.", *J. Amer. Chem. Soc.*, 80:1247–1254 (1958).

Roskos et al., "Development of a drug delivery system for the treatment of periodontal disease based on bioerodible poly(ortho esters)," *Biomaterials,* 16(*4*):313–7 (1995).

Rothen–Weinhold et al., "Release of BSA from poly(ortho ester) extruded thin strands," *J Control Release,* 71(*1*):31–7 (2001).

Schwach–Abdellaoui et al., "Optimization of a novel bioerodible device based on auto–catalyzed poly(ortho esters) for controlled delivery of tetracycline to periodontal pocket," *Biomaterials.* 22(*12*):1659–66 (2001).

Schwach–Abdellaoui et al., "Bioerodible injectable poly-(ortho ester) for tetracycline controlled delivery to periodontal pockets: preliminary trial in humans," *AAPS PharmSci.* 4(*4*):article 20 pp. 1–7 (2002).

Schwach–Abdellaoui et al., "Synthesis and characterization of self–catalyzed poly(ortho–esters) based on decanediol and decanediol–lactate," *J Biomater Sci Polym Ed.* 10(*3*):375–89 (1999).

Shi et al., "Double walled POE/PLGA microspheres: encapsulation of water–soluble and water–insoluble proteins and their release properties," *J. Control Release.* 89(*2*):167–77 (2003).

Sintzel et al., "In vitro drug release from self–catalyzed poly(ortho ester): case study of 5–fluorouracil," *J Control Release.* 55(*2–3*):213–8 (1998).

Sintzel et al., "Synthesis and characterization of self–catalyzed poly(ortho ester)," *Biomaterials.* 19(*7–9*):791–800 (1998).

Steinicke A. et al. "Oral formulations of gonadotropin releasing hormone" *Chemical Abstracts* 115(*22*): 239759j (1991).

Taylor et al., "Six bioabsorbable polymers: in vitro acute toxicity of accumulated degradation products," *J Appl Biomater.* 5(*2*):151–7 (1994).

*Textbook of Polymer Science 3rd Ed.* Billmeyer, F.W. (ed.) New York: John Wiley & Sons Ch. 17 pp. 457–485 (1984).

Uyeda, C.T., "Agglutination of Cardiolipin–Coated Latex Particles with VDRL– And Kolmer–Positive Serums," *American Journal of Clinical Pathology 40*:329–333 (1963).

van de Weert et al., "Semi–solid self–catalyzed poly(ortho ester)s as controlled–release systems: protein release and protein stability issues," *J Pharm Sci.*91(*4*):1065–74 (2002).

Wan et al., "POE–PEG–POE triblock copolymeric microspheres containing protein. II. Polymer erosion and protein release mechanism," *J Control Release.*75(*1–2*):129–41 (2001).

Yang et al. "POE/PLGA composite microspherers: formation and in vitro behavior of double walled microspheres," *J Control Release.* 88(*2*):201–13 (2003).

Yang et al. "POE–PEG–POE triblock copolymeric microspheres containing protein. I. Preparation and characterization," *J Control Release.* 75(*1–2*):115–28 (2001).

Zignani et al., "A poly(ortho ester) designed for combined ocular delivery of dexamethasone sodium phosphate and 5–fluorouracil: subconjunctival tolerance and in vitro release," *Eur J Pharm Biopharm.* 50(*2*):251–5 (2000).

Zignani et al., "Improved biocompatibility of a viscous bioerodible poly(ortho ester) by controlling the environmental pH during degradation," *Biomaterials 21*(*17*):1773–8 (2000).

Heller et al., "Preparation of Polyacetals by the Reaction of Divinyl Ethers and Polyols", *J. Polymer Sci., Polymer Letters Ed.,* 18, 293–297 (1980).

Beyerstedt et al., "The Preparation And Properties of Ketene Diethylacetal", *J. Amer. Chem. Soc.,* 58, 529–553 (1936).

BLOCK COPOLYMERS BASED ON POLY (ORTHO ESTERS) CONTAINING AMINE GROUPS

CROSS-REFERENCE TO RELATED APPLICATIONS

This application is a divisional of application Ser. No. 10/295,766, filed Nov. 14, 2002, now U.S. Pat. No. 6,667,371, which is a continuation-in-part of application Ser. No. 09/991,537, filed Nov. 16, 2001 now U.S. Pat. No. 6,524,606. Each of these applications is incorporated into this application by reference.

BACKGROUND OF THE INVENTION

1. Field of the Invention

This application relates to block copolymers based on poly(ortho esters) containing amine groups.

2. Description of the Related Art

Interest in synthetic biodegradable polymers for the systemic delivery of therapeutic agents began in the early 1970's with the work of Yolles et al., *Polymer News* 1:9–15 (1970) using poly(lactic acid). Since that time, numerous other polymers have been prepared and investigated as bioerodible matrices for the controlled release of therapeutic agents.

U.S. Pat. Nos. 4,079,038, 4,093,709, 4,131,648, 4,138,344 and 4,180,646 disclose biodegradable or bioerodible poly(ortho esters). These polymers are formed by a reaction between an orthoester (or orthocarbonate) such as 2,2-diethoxytetrahydrofuran and a diol such as 1,4-cyclohexanedimethanol. The reaction requires elevated temperature and reduced pressure and a relatively long reaction time. Drugs or other active agents are retained in the polymer matrix to be released as the polymer biodegrades due to hydrolysis of the labile linkages.

U.S. Pat. No. 4,304,767 discloses polymers prepared by reacting a polyol with a polyfunctional ketene acetal. These polymers represent a significant improvement over those of U.S. Pat. Nos. 4,079,038, 4,093,709, 4,131,648, 4,138,344 and 4,180,646, since synthesis proceeds readily at room temperature and atmospheric pressure, and the resulting polymers have superior properties.

Further polymers are disclosed in U.S. Pat. No. 4,957,998. These polymers contain acetal, carboxy-acetal and carboxy-orthoester linkages, and are prepared by a two-step process beginning with the reaction between a polyfunctional ketene acetal and a compound containing a vinyl ether, followed by reaction with a polyol or polyacid.

Still further polymers of a similar type are disclosed in U.S. Pat. No. 4,946,931. The polymers are formed by a reaction between a compound containing a multiplicity of carboxylate functions and a polyfunctional ketene acetal. The resulting polymers have very rapid erosion times.

Despite the ease with which the orthoester linkage hydrolyses, poly(ortho esters) known in the prior art are extremely stable materials when placed in an aqueous buffer, or when residing in the body. This stability is attributable to the extreme hydrophobicity of the poly(ortho esters) which severely limits the amount of water that can penetrate the polymer. To achieve useful erosion rates, therefore, acidic excipients must be physically incorporated into the polymer. While this allows control over erosion rates, the physically incorporated acidic excipient can diffuse from the polymer matrix at varying rates, leaving a matrix that is completely depleted of excipient while the polymer still has a very long lifetime remaining.

U.S. Pat. Nos. 4,764,364 and 4,855,132 describe bioerodible polymers, in particular poly(ortho esters) containing an amine functionality. The polymers are said to erode more rapidly at lower pH than at higher pH in an acidic aqueous environment.

Micellar System for Tumor Targeting

One of the major problems in treating cancer is the difficulty of achieving a sufficient concentration of an anticancer agent in the tumor. This is due to the toxicity, sometimes extreme, of such agents which severely limits the amounts that can be used. However, a major discovery in cancer chemotherapy has been the so-called EPR (enhanced permeation and retention) effect. The EPR effect is based on the observation that tumor vasculature, being newly formed vasculature, has an incompletely formed epithelium and is much more permeable than established older vasculature which is essentially impermeable to large molecules. Further, lymphatic drainage in tumors is very poor thus facilitating retention of anticancer agents delivered to the tumor.

The EPR effect can be used in cancer targeting by using delivery systems containing anticancer drugs that are too large to permeate normal vasculature, but which are small enough to permeate tumor vasculature, and two approaches have been developed. In one approach, a water-soluble polymer is used that contains an anticancer drug chemically bound to the polymer via a hydrolytically labile linkage. Such drug-polymer constructs are injected intravenously and accumulate in the tumors, where they are internalized by the cells via endocytosis and released in the lysosomal compartment of the cell via enzymatic cleavage of the labile bond attaching the drug to the polymer. Two disadvantages of this approach are that, first, nondegradable, water-soluble polymers have been used, and this requires a tedious fractionation of the polymer to assure that the molecular weight of the polymer is below the renal excretion threshold, and, second, the drug must be chemically attached to the polymer, which in effect creates a new drug entity with consequent regulatory hurdles that must be overcome. The use of polymer conjugates in cancer diagnosis and treatment is discussed in Duncan et al., "The role of polymer conjugates in the diagnosis and treatment of cancer", *S. T. P. Pharma Sciences,* 6(4), 237–263 (1996), and an example of an alginate-bioactive agent conjugate is given in U.S. Pat. No. 5,622,718.

An alternate approach has been described. In this approach, an AB or ABA block copolymer is prepared where the B-block is hydrophobic and the A-block is hydrophilic. When such a material is placed in water, it will self-assemble into micelles with a hydrophobic core and a hydrophilic shell surrounding the core. Such micelles have a diameter of about 100 nm, which is large enough that when they are injected intravenously, the micelles can not leave the normal vasculature, but they are small enough to leave the vasculature within tumors. Further, a 100 nm diameter is too small to be recognized by the reticuloendothelial system, thus enhancing micelle lifetime within the blood stream. Additionally, when the hydrophilic block is poly(ethylene glycol), further enhancement of circulation time is noted, as has been observed with "stealth" liposomes. The use of block copolymer micelles is reviewed in Kwon et al., "Block copolymer micelles as long-circulating drug delivery vehicles", *Adv. Drug Delivery Rev.,* 16, 295–309 (1995).

U.S. Pat. Nos. 5,412,072; 5,449,513; 5,510,103; and 5,693,751 describe block copolymers useful as micellar delivery systems where the hydrophilic block is polyethylene glycol and the hydrophobic blocks are various derivatives of poly(aspartic acid), poly(glutamic acid) and polylysine. U.S. Pat. Nos. 5,412,072 and 5,693,751 describe an approach where drugs have been chemically attached to the hydrophobic segment; while U.S. Pat. Nos. 5,449,513 and 5,510,103 describe an approach where hydrophobic drugs have been physically entrapped within the hydrophobic portion of the micelle. This latter approach is clearly preferable because no chemical modification of the drug is necessary.

Bioerodible Block Copolymer Matrix for Controlled Drug Delivery

In AB, ABA, or BAB block copolymers comprising a hydrophilic A block and a hydrophobic B block, the A and B blocks are incompatible and on a microscopic scale will phase-separate. This phase separation imparts unique and useful thermal properties to the material.

There is considerable prior art in the development of block copolymers comprised of poly(ethylene glycol) and bioerodible hydrophobic segments such as poly(L-lactic acid), poly(L-lactic-co-glycolic acid) copolymers and poly (e-caprolactone), and discussion of their use as drug delivery agents. For example, see Wolthuis et al., "Synthesis and characterization of poly(ethylene glycol) poly-L-lactide block copolymers", *Third Eur. Symp. Controlled Drug Delivery*, 271–276 (1994), Youxin et al., "Synthesis and properties of biodegradable ABA triblock copolymers . . . ", *J. Controlled Release*, 27, 247–257 (1993), and U.S. Pat. No. 5,133,739.

Poly(ortho esters) are known as potential vehicles for sustained release drug delivery. See, for example, Heller, "Poly(Ortho Esters)", *Adv. Polymer Sci.*, 107, 41–92 (1993), and references cited therein, and U.S. Pat. Nos. 4,304,767, 4,946,931, 4,957,998, and 5,968,543.

U.S. Pat. No. 5,939,453 describes block copolymers prepared from polyethylene glycols and certain poly(ortho esters).

The documents listed in this section and elsewhere throughout this application are incorporated into this application by reference.

SUMMARY OF THE INVENTION

In a first aspect, this invention is block copolymers of formula X, formula Y, and formula Z:

$$R^A\text{—}[OCH_2CH_2]_f\text{—}[POE]_g\text{—}H \quad (X),$$

$$R^A\text{—}[OCH_2CH_2]_f\text{—}[POE]_g\text{—}[OCH_2CH_2]_h\text{—}OR^B \quad (Y),$$

$$H\text{—}A\text{—}[POE]_g\text{—}[OCH_2CH_2]_h\text{—}[POE]_j\text{—}H \quad (Z),$$

where:
$R^A$ is $C_1$–$C_4$ alkyl;
$R^B$ is $C_1$–$C_4$ alkyl;
f and h are independently an integer from 2 to 1000;
g and j are independently an integer from 2 to 200;
POE is a poly(ortho ester) unit of formula IA or formula IIA:

(IA)

(IIA)

where
$R^*$ is a $C_1$–$C_4$ alkyl;
R is a bond, $\text{—}(CH_2)_a\text{—}$, or $\text{—}(CH_2)_b\text{—}O\text{—}(CH_2)_c\text{—}$; where a is an integer of 1 to 10, and b and c are independently integers of 1 to 5; and
each A is independently selected from $R^1$, $R^2$, $R^3$, and $R^4$, where $R^1$ is:

where:

p is an integer of 1 to 20;
$R^5$ is hydrogen or $C_1$–$C_4$ alkyl; and
$R^6$ is:

where:

s is an integer of 0 to 30;
t is an integer of 2 to 200; and
$R^7$ is hydrogen or $C_1$–$C_4$ alkyl;
$R^2$ is:

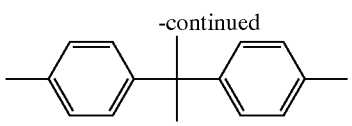

R³ is:

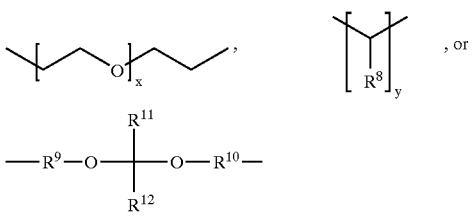

where:
x is an integer of 0 to 30;
y is an integer of 2 to 200;
$R^8$ is hydrogen or $C_1$–$C_4$ alkyl;
$R^9$ and $R^{10}$ are independently $C_1$–$C_{12}$ alkylene;
$R^{11}$ is hydrogen or $C_1$–$C_6$ alkyl and $R^{12}$ is $C_1$–$C_6$ alkyl; or $R^{11}$ and $R^{12}$ together are $C_3$–$C_{10}$ alkylene; and
$R^4$ is the residue of a diol containing at least one amine functionality incorporated therein;
in which at least 0.1 mol % of the A units are $R^1$, and at least 0.1 mol % of the A units are $R^4$.

In a second aspect, this invention is a micellar pharmaceutical composition for the delivery of a hydrophobic or water-insoluble active agent, comprising the active agent physically entrapped within but not covalently bonded to a drug carrier comprising a block copolymer of formula X, formula Y, or formula Z, or a mixture thereof.

In a third aspect, this invention is a composition for the sustained release of an active agent, comprising the active agent dispersed in a matrix comprising a block copolymer of formula X, formula Y, or formula Z, or a mixture thereof.

In an fourth aspect, this invention is a process for the preparation of a block copolymer of formula X, formula Y, or formula Z, as described in the "Detailed description of the invention".

DETAILED DESCRIPTION OF THE INVENTION

It has now been discovered that poly(ortho esters) useful as orthopedic implants or vehicles for the sequestration and sustained delivery of drugs, cosmetic agents and other beneficial agents can be prepared in such a manner that the rate and degree to which they are hydrolyzed by contact with bodily fluids at normal body temperature and pH can be controlled without addition of exogenous acid. This discovery resides in the incorporation of esters of short-chain α-hydroxy acids such as esters of glycolic acid, lactic acid or glycolic-co-lactic acid copolymer into the poly(ortho ester) chain and variation of the amount of these esters relative to the poly(ortho ester) as a whole.

In the presence of water, these esters, when incorporated into the poly(ortho ester) chain, are readily hydrolyzed at a body temperature of 37° C. and a physiological pH, in particular at a pH of 7.4, to produce the corresponding α-hydroxy acids. The α-hydroxy acids then act as an acidic excipient to control the hydrolysis rate of the poly(ortho ester) portion of the block copolymer. When the block copolymer is used as a vehicle or matrix entrapping an active agent, the hydrolysis of the poly(ortho ester) causes release of the active agent.

The use in these poly(ortho esters) of diols containing amine functionalities causes the poly(ortho esters) to become more pH-sensitive than poly(ortho esters) not containing such diols, and thus to hydrolyze yet more readily at lower pH than at higher pH. This is particularly so in an acidic aqueous environment, such as is found within animal cells, and enables the poly(ortho esters) to be relatively stable within the extracellular environment within an animal, such as within the blood, but to hydrolyze rapidly within the intracellular environment. This makes these poly (ortho esters) particularly suitable for delivery of active agents within the cell.

Definitions

Unless defined otherwise in this specification, all technical and scientific terms are used herein according to their conventional definitions as they are commonly used and understood by those of ordinary skill in the art of synthetic and pharmaceutical chemistry.

"Active agent" includes any compound or mixture of compounds which produces a beneficial or useful result. Active agents are distinguishable from such components as vehicles, carriers, diluents, lubricants, binders and other formulating aids, and encapsulating or otherwise protective components. Examples of active agents are pharmaceutical, agricultural or cosmetic agents. Suitable pharmaceutical agents include locally or systemically acting pharmaceutically active agents which may be administered to a subject by topical or intralesional application (including, for example, applying to abraded skin, lacerations, puncture wounds, etc., as well as into surgical incisions) or by injection, such as subcutaneous, intradermal, intramuscular, intraocular, or intra-articular injection. Examples of these agents include, but are not limited to, anti-infectives (including antibiotics, antivirals, fungicides, scabicides or pediculicides), antiseptics (e.g., benzalkonium chloride, benzethonium chloride, chlorhexidine gluconate, mafenide acetate, methylbenzethonium chloride, nitrofurazone, nitromersol and the like), steroids (e.g., estrogens, progestins, androgens, adrenocorticoids, and the like), therapeutic polypeptides (e.g. insulin, erythropoietin, morphogenic proteins such as bone morphogenic protein, and the like), analgesics and anti-inflanimatory agents (e.g., aspirin, ibuprofen, naproxen, ketorolac, COX-1 inhibitors, COX-2 inhibitors, and the like), cancer chemotherapeutic agents (e.g., mechlorethamine, cyclophosphamide, fluorouracil, thioguanine, carmustine, lomustine, melphalan, chlorambucil, streptozocin, methotrexate, vincristine, bleomycin, vinblastine, vindesine, dactinomycin, daunorubicin, doxorubicin, tamoxifen, and the like), narcotics (e.g., morphine, meperidine, codeine, and the like), local anesthetics (e.g., the amide- or anilide-type local anesthetics such as bupivacaine, dibucaine, mepivacaine, procaine, lidocaine, tetracaine, and the like), antiangiogenic agents (e.g., combrestatin, contortrostatin, anti-VEGF, and the like), polysaccharides, vaccines, antigens, DNA and other polynucleotides, antisense oligonucleotides, and the like. The present invention may also be applied to other locally acting active agents, such as astringents, antiperspirants, irritants, rubefacients, vesicants, sclerosing agents, caustics, escharotics, keratolytic agents, sunscreens and a variety of dermatologics including hypopigmenting and antipruritic agents. The term "active agents" further includes biocides such as fungicides, pesticides, and herbicides, plant growth promoters or inhibitors, preservatives, disinfectants, air purifiers and nutrients.

"Alkyl" denotes a linear saturated hydrocarbyl having from one to the number of carbon atoms designated, or a branched or cyclic saturated hydrocarbyl having from three to the number of carbon atoms designated (e.g., $C_1$–$C_4$ alkyl). Examples of alkyl include methyl, ethyl, n-propyl, isopropyl, cyclopropyl, n-butyl, t-butyl, cyclopropylmethyl, and the like.

"Alkylene" denotes a branched or unbranched saturated divalent radical having from one to the number of carbon atoms designated (e.g., $C_1$–$C_{12}$ alkylene). Examples of alkylene include methylene (—$CH_2$—), ethylene (—$CH_2CH_2$—), isopentylene (—$CH_2$—$CH(CH_3)$—$CH_2$—$CH_2$—), n-octylene (—$(CH_2)_8$—) and the like.

"Bioerodible" and "bioerodibility" refer to the degradation, disassembly or digestion of the poly(ortho ester) by action of a biological environment, including the action of living organisms and most notably at physiological pH and temperature. A principal mechanism for bioerosion of the poly(ortho esters) of the present invention is hydrolysis of linkages between and within the units of the poly(ortho ester).

"Comprising" is an inclusive term interpreted to mean containing, embracing, covering or including the elements listed following the term, but not excluding other unrecited elements.

"Controlled release", "sustained release", and similar terms are used to denote a mode of active agent delivery that occurs when the active agent is released from the delivery vehicle at an ascertainable and controllable rate over a period of time, rather than dispersed immediately upon application or injection. Controlled or sustained release may extend for hours, days or months, and may vary as a function of numerous factors. For the pharmaceutical composition of the present invention, the rate of release will depend on the type of the excipient selected and the concentration of the excipient in the composition. Another determinant of the rate of release is the rate of hydrolysis of the linkages between and within the units of the poly(ortho ester). The rate of hydrolysis in turn may be controlled by the composition of the poly(ortho ester) and the number of hydrolysable bonds in the poly(ortho ester). Other factors determining the rate of release of an active agent from the present pharmaceutical composition include particle size, acidity of the medium (either internal or external to the matrix) and physical and chemical properties of the active agent in the matrix.

"Matrix" denotes the physical structure of the block copolymer which essentially retains the active agent in a manner preventing release of the agent until the block copolymer erodes or decomposes.

"PEG" means polyethylene glycol, H—[$OCH_2CH_2$]$_f$—OH, with a numerical suffix indicating the nominal number average molecular weight, $M_n$. Unless the context requires otherwise, "PEG" also includes polyethylene glycol mono ($C_1$–$C_4$ alkyl) ethers, R—[$OCH_2CH_2$]$_f$—OH, where R is $C_1$–$C_4$ alkyl, sometimes referred to as "RPEG".

"POE" means a poly(ortho ester) or a poly(ortho ester) unit.

"Sequestration" is the confinement or retention of an active agent within the internal spaces of a block coplymer matrix. Sequestration of an active agent within the matrix may limit the toxic effect of the agent, prolong the time of action of the agent in a controlled manner, permit the release of the agent in a precisely defined location in an organism, or protect unstable agents against the action of the environment.

A "therapeutically effective amount" means the amount that, when administered to an animal for treating a disease, is sufficient to effect treatment for that disease.

"Treating" or "treatment" of a disease includes preventing the disease from occurring in an animal that may be predisposed to the disease but does not yet experience or exhibit symptoms of the disease (prophylactic treatment), inhibiting the disease (slowing or arresting its development), providing relief from the symptoms or side-effects of the disease (including palliative treatment), and relieving the disease (causing regression of the disease). For the purposes of this invention, a "disease" includes pain.

A "unit" denotes an individual segment of a poly(ortho ester) chain, which consists of the residue of a diketene acetal molecule and the residue of a polyol.

An "α-hydroxy acid containing" unit denotes a unit where A is $R^1$, i.e. in which the polyol is prepared from an α-hydroxy acid or cyclic diester thereof and a diol of the formula HO—$R^6$—OH. The fraction of the poly(ortho ester) that is α-hydroxy acid containing units affects the rate of hydrolysis (or bioerodibility) of the poly(ortho ester) portion of the block copolymer, and in turn, the release rate of the active agent.

An "amine containing" unit denotes a unit where A is $R^4$, i.e. in which the diol contains an amine functionality. The fraction of the poly(ortho ester) that is amine containing units affects the pH-sensitivity of the rate of hydrolysis (or bioerodibility) of the poly(ortho ester) portion of the block copolymer, and in turn, the release rate of the active agent.

"Hard" and "soft" units denote individual units of the poly(ortho ester), the contents of which relative to the poly(ortho ester) as a whole determine the mechanophysical state of the poly(ortho ester) portion of the block copolymer. "Hard" units are units where A is $R^2$ and "soft" units are units where A is $R^3$.

"Vehicle" and "carrier" denote an ingredient that is included in a composition such as a pharmaceutical or cosmetic preparation for reasons other than a therapeutic or other biological effect. Functions served by vehicles and carriers include transporting an active agent to a site of interest, controlling the rate of access to, or release of, the active agent by sequestration or other means, and facilitating the application of the agent to the region where its activity is needed. Examples of vehicles and carriers include solids such as microparticles, microspheres, rods, and wafers; and semisolids that are dispensable by syringe or the like, or by spreading with a tool such as a spatula.

Ranges given, such as temperatures, times, sizes, and the like, should be considered approximate, unless specifically stated.

The Block Copolymers

The block copolymers are of formula X, formula Y, and formula Z:

  (X),

  (Y),

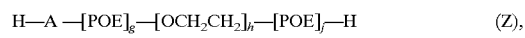  (Z), where:
$R^A$ is $C_1$–$C_4$ alkyl;
$R^B$ is $C_1$–$C_4$ alkyl;
f and h are independently an integer from 2 to 1000;
g and j are independently an integer from 2 to 200;

POE is a poly(ortho ester) unit of formula IA or formula IIA:

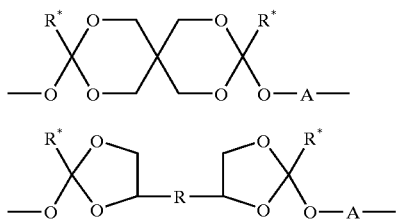
(IA)

(IIA)

where
R* is a $C_1$–$C_4$ alkyl;
R is a bond, —$(CH_2)_a$—, or —$(CH_2)_b$—O—$(CH_2)_c$—; where a is an integer of 1 to 10, and b and c are independently integers of 1 to 5; and
each A is independently selected from $R^1$, $R^2$, $R^3$, and $R^4$, where
$R^1$ is:

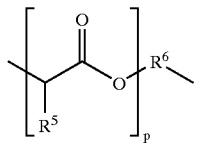

where:
p is an integer of 1 to 20;
$R^5$ is hydrogen or $C_1$–$C_4$ alkyl; and
$R^6$ is:

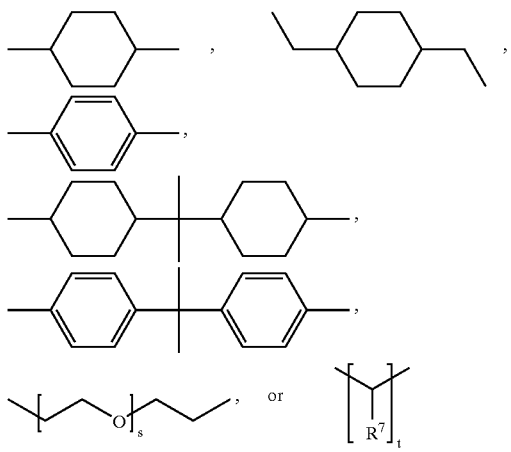

where:
s is an integer of 0 to 30;
t is an integer of 2 to 200; and
$R^7$ is hydrogen or $C_1$–$C_4$ alkyl;
$R^2$ is:

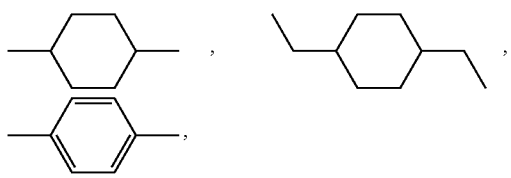

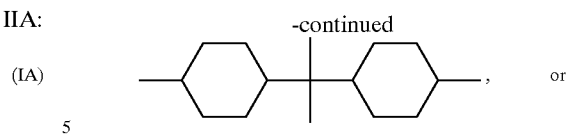

$R^3$ is:

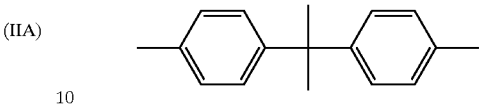

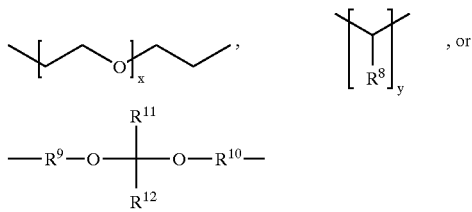

where:
x is an integer of 0 to 30;
y is an integer of 2 to 200;
$R^8$ is hydrogen or $C_1$–$C_4$ alkyl;
$R^9$ and $R^{10}$ are independently $C_1$–$C_{12}$ alkylene;
$R^{11}$ is hydrogen or $C_1$–$C_6$ alkyl and $R^{12}$ is $C_1$–$C_6$ alkyl; or $R^{11}$ and $R^{12}$ together are $C_3$–$C_{10}$ alkylene; and
$R^4$ is the residue of a diol containing at least one amine functionality incorporated therein;
in which at least 0.1 mol % of the A units are $R^1$, and at least 0.1 mol % of the A units are $R^4$.

Because of the polymeric character of these molecules, the number of repeating units within the blocks, f, g, h, and j necessarily represent averages of distributions rather than exact numbers; and in particular, when f and h or g and j are described as being the same, this indicates that the average values of f and h, or of g and j, should be approximately the same. Similarly, the lengths of other polymeric chains, such as the poly(ethylene glycol) of $R^6$; of the long chain diol of $R^6$; and of the poly(α-hydroxy acid) group within $R^1$ necessarily represent averages of distributions rather than exact numbers.

The copolymers are AB (formula X), ABA (formula Y), and BAB (formula Z) block copolymers in which the A blocks are hydrophilic poly(ethylene glycol) and the B blocks are hydrophobic poly(ortho ester). Within these, the poly(ortho ester) blocks are composed of alternating residues of a diketene acetal and a diol.

The properties of the copolymers, including both the mechanophysical properties and the bioerodibility, are determined by the type of the copolymer, whether AB diblock, ABA triblock, or BAB triblock, the length of the PEG and POE blocks, and the diol(s) used in the POE blocks (in particular, the proportion of diol of the general formula HO—$R^1$—OH used in the POE blocks).

With respect to the individual "α-hydroxy acid containing" unit, p is preferably 1 to 6, more preferably 1 to 4, most preferably 1 or 2, especially 1; $R^5$ is preferably hydrogen or methyl, more preferably hydrogen; and in the above definitions of $R^6$, s is preferably 2 to 12, more preferably 2 to 6 and most preferably 2; $R^7$ is preferably hydrogen, and t is preferably 4 to 12, more preferably 4 to 6 and most preferably 6.

With respect to the individual "hard" unit, $R^2$ is preferably cyclohexanedimethanol.

With respect to the individual "soft" unit, in the definitions of $R^3$, x is preferably 2 to 12, more preferably 2 to 6 and most preferably 2; $R^8$ is preferably hydrogen, and y is preferably 4 to 12, for example 10; otherwise, $R^9$ and $R^{10}$ are preferably identical, more preferably an unbranched $C_4$–$C_{12}$ alkylene, and especially an unbranched $C_6$–$C_{12}$ alkylene, $R^1$ is preferably hydrogen, and $R^{12}$ is preferably methyl.

With respect to the individual "amine containing" unit, diols of the formula HO—$R^4$—OH include aliphatic diols of 2 to 20 carbon atoms, preferably 2 to 10 carbon atoms, interrupted by one or two amine groups, and di(hydroxy)- or bis(hydroxyalkyl)-cyclic amines, having from 4 to 20, preferably 4 to 10, carbon or nitrogen atoms between the hydroxy groups; and the amine groups are secondary or, preferably, tertiary, amine groups.

Preferred polymers are those in which one or more of the following are true:

(1) f and h are independently an integer from 10 to 500, especially from 50 to 250, for example 100, for micellar delivery; and f and h are independently an integer from 50 to 1000, especially from 100 to 1000, for example from 250 to 1000, for bioerodible matrices; and f and h are preferably the same if both are present;

(2) g and j are independently an integer from 5 to 100, especially 10 to 50, for example 15, for micellar delivery; and g and j are independently an integer from 10 to 200, especially from 20 to 200, for example from 50 to 200, for bioerodible matrices; and g and j are preferably the same if both are present;

(3) R* is $C_2$–$C_4$ alkyl, especially ethyl;

(4) $R^A$ and $R^B$ are methyl; and (5) the proportion of POE units where A is $R^1$ is from 0.1 to 10%, in addition to the preferences given above with respect to the various POE units.

While a block copolymer having any one of these preferences listed above is preferred over a block copolymer not having that preference, the block copolymers will be more preferred the greater the number of preferences met.

The bioerodibility of a block copolymer of this invention is determined by two factors: first, the extent to which the copolymer will dissolve/become suspended intact in an aqueous medium, the solubility of the copolymer; and second, the extent to which the copolymer, or, to be more precise, the POE block(s), will degrade in the environment to which it is exposed. The speed of degradation of the POE block(s) of the copolymer in an aqueous environment is determined by the hydrophilicity of the copolymer and by the proportion of α-hydroxy acid ester groups, if present, in the block(s), with greater bioerodibility being achieved by inclusion of a greater proportion of diols of the formula HO—$R^1$—OH in the diol mixture used to form the POE block(s), and greater pH-sensitivity of the rate of bioerodibility (making the material more rapidly bioerodible at low pH) being achieved being achieved by inclusion of a greater proportion of diols of the formula HO—$R^4$—OH in the diol mixture used to form the POE block(s).

Block copolymers having a higher mole percentage of the "α-hydroxy acid containing" units will have a higher rate of bioerodibility. Preferred block copolymers are those in which the mole percentage of the "α-hydroxy acid containing" units is in the range of about 0.1 to about 99 mole percent, such as about 0.5 to about 50 mole percent, more preferably from about 1 to about 30 mole percent, for example from about 5 to about 30 mole percent, especially from about 10 to about 30 mole percent.

Block copolymers having a higher mole percentage of the "amine containing" units will have a rate of bioerodibility that is more pH-sensitive than non-"amine containing" poly (ortho esters), and increases at lower pH. Preferred block copolymers are those in which the mole percentage of the "amine containing" units is in the range of about 0.1 to about 99.9 mole percent, more preferably from about 1 to about 80 mole percent, for example from about 5 to about 50 mole percent, especially from about 10 to about 30 mole percent.

The invention includes block copolymers which contain all four types of units as well as block copolymers containing units from only the "α-hydroxy acid containing" units and "amide containing" units, or a mixture of these units with only one of the "hard" units or "soft" units. It also includes block copolymers prepared from a mixture of units which contains two or more diols of the same type.

Preparation of the Block Copolymers

The diblock copolymers of formula X are prepared in a two-step synthesis.

In the first step, a PEG lower alkyl ether of the formula $R^A$—[$OCH_2CH_2$]$_f$—OH, where $R^A$ is $C_1$–$C_4$ alkyl (an RPEG), is reacted with an excess of a di(ketene acetal) of formula III or formula IV:

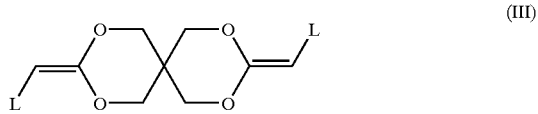 (III)

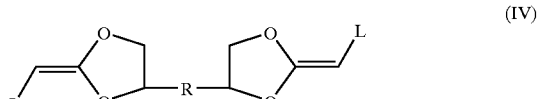 (IV)

to form an intermediate of formula VII or formula VIII:

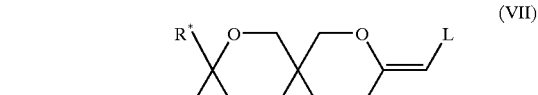 (VII)

 (VIII)

Polyethylene glycols, and polyethylene glycol lower alkyl ethers of various chain lengths (molecular weights) are available from a number of sources, including Aldrich Chemical Company, Inc., Milwaukee, Wis., and Shearwater Polymers, Huntsville, Ala.

The preparation of the di(ketene acetals) of the types of formula III and formula IV is disclosed in U.S. Pat. Nos. 4,304,767, 4,532,335, and 5,968,543; and will be known to a person of ordinary skill in the art. A typical method is the condensation of a bis(diol) of formula V (i.e. pentaerythritol) or formula VI:

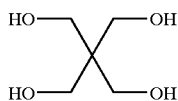

(V)

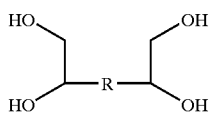

(VI)

with two equivalents of a 2-halocarboxaldehyde dialkyl acetal, such as 2-bromoacetaldehyde diethyl acetal, followed by dehydrohalogenation to give the di(ketene acetal). The condensation of a glycol with diethylbromoacetals is described in Roberts et al., *J. Am. Chem. Soc.,* 80, 1247–1254 (1958), and dehydrohalogenation is described in Beyerstedt et al., *J. Am. Chem. Soc.,* 58, 529–553 (1936).

The di(ketene acetals) may also be prepared by the isomerization of di(vinyl acetals). Thus, for example, 3,9-di(ethylidene)-2,4,8,10-tetraoxaspiro[5.5]undecane (DETOSU) may be prepared by the isomerization of 3,9-divinyl-2,4,8,10-tetraoxaspiro[5.5]undecane, using n-butyllithium in ethylenediamine or by photoisomerization. The isomerization of the double bond is described in Corey et al., *J. Org. Chem.,* 38, 3224 (1973). The di(vinyl acetals) may be prepared by the condensation of the bis(diol) of formula V or formula VI with two equivalents of a vinylic aldehyde, such as acrolein or crotonaldehyde, or their dialkyl acetals, such as acrolein dimethyl acetal, and such condensation reactions are well known.

The bis(diol) of formula VI where R is a bond is erythritol. The bis(diol) of formula VI where R is —(CH$_2$)$_a$— may be prepared by the oxidation of an α,ω-diene, such as 1,3-butadiene or 1,5-hexadiene, with an oxidizing reagent such as osmium tetroxide/hydrogen peroxide, or by other methods known in the art, to give the bis(diol). The bis(diol) of formula VI where R is —(CH$_2$)$_b$—O—(CH$_2$)$_c$— may be prepared by the reaction of an ω-hydroxy-α-olefin, such as allyl alcohol, with an ω-haloalkyloxirane, such as epichlorohydrin, to form an ω-epoxy-α-olefin with the backbone interrupted by an oxygen atom, such as 2-allyloxymethyloxirane, which is then oxidized with an oxidizing reagent such as osmium tetroxide/hydrogen peroxide, or by other methods known in the art, to give the bis(diol).

In the second step, a diol of the formula HO—R$^1$—OH and a diol of the formula HO—R$^4$—OH, and optionally a diol of the formulae HO—R$^2$—OH and/or HO—R$^3$—OH, or a mixture thereof, is reacted with the solution of the first step (containing the intermediate of formula VII or VIII and the excess di(ketene acetal)) to extend the POE block, thereby forming the diblock copolymer of formula X.

The preparation of diols of the formula HO—R$^1$—OH is generally disclosed in U.S. Pat. No. 5,968,543, by reacting a cyclic ester of an α-hydroxy acid with a diol of the formula HO—R$^6$—OH. Diols of the formula HO—R$^2$—OH are generally commercially available. Diols of the formula HO—R$^3$—OH may be commercially available or their preparation is generally disclosed in Heller et al., *J. Polymer Sci., Polymer Letters Ed.* 18:293–297 (1980), by reacting an appropriate divinyl ether with an excess of an appropriate diol.

Diols of the formula HO—R$^4$—OH are diols containing at least one secondary or, preferably, tertiary amine. They include diols where R$^4$ is an amine such as R'NR"R'" or R'N=R'" where each of R' and R'" is independently an aliphatic, aromatic, or aromatic/aliphatic straight or branched chain hydrocarbyl to which is bonded one of the hydroxy groups of the diol, and optionally where R' and R'" are bonded so that the amine is a cyclic amine, especially a straight or branched chain alkyl of 2 to 10 carbon atoms, and more especially 2 to 5 carbon atoms, and R" is hydrogen, $C_{1-6}$ alkyl, $C_{6-10}$ aryl, or aralkyl, especially alkyl, and more especially methyl. Other diols include those where two such amine groups are present, including in the same cyclic amine. Thus representative cyclic amine-based diols of the formula HO—R$^4$—OH include di(hydroxy)- or bis(hydroxyalkyl)-substituted cyclic amines such as substituted pyridine, piperidine, pyridazine, pyrimidine, pyrazine, piperazine, and the like. Some representative diols of the formula HO—R$^4$—OH include N,N-bis(2-hydroxyethyl) amine, N,N-bis(2-hydroxyethyl)aniline, N-methyl-N,N-bis(2-hydroxyethyl)amine, N-butyl-N,N-bis(2-hydroxyethyl) amine, N-propyl-N,N-bis(2-hydroxyethyl)amine, N-2-propyl-N,N-bis(2-hydroxyethyl) amine, N-cyclohexyl-N,N-bis(2-hydroxyethyl)amine, N-benzyl-N,N-bis(2-hydroxyethyl)amine, 3-dimethylamino-1,2-propanediol, 3-(tert-butylamino)-1,2-propanediol, 1,4-bis(2-hydroxyethyl)piperidine, 1,4-bis(2-hydroxyethyl) piperazine, 1,4-bis (hydroxymethyl)piperazine, 7-(2,3-dihydroxypropyl)theophylline, 3,6-dihydroxypyridazine, 2,3-dihydroxypyridine, 2,4-dihydroxy-pyridine, 2,6-dihydroxypyridine, 4,6-dihydroxypyrimidine, N-ethyl-N,N-bis(2-hydroxyethyl)amine, and the like. Such diols include those containing both secondary and tertiary amines, though tertiary amines are preferred. Amine-containing polyols include N-3-hydroxypropyl-N,N-bis(2-hydroxyethyl) amine, 1,3-bis [tris(hydroxymethyl)methylamino]propane, 2,2-bis(hydroxymethyl)-2,2',2"-nitrotriethanol, tris(2-hydroxyethyl)amine, tris(3-hydroxypropyl)amine, and the like. These diols are known to the art in reported syntheses and many are commercially available.

Since the di(ketene acetal) and the diol react in a 1:1 ratio to form the POE block of the diblock copolymer, the quantities of the RPEG, the diketene acetal, and the diol are chosen so that the molar amount of di(ketene acetal) is equal to the sum of the molar amounts of the RPEG and the diol.

The value of f in the PEG block, i.e. the length of the PEG block, is determined by the RPEG chosen. The value of g in the POE block, i.e. the length of the POE block, is determined by the molar quantity of diol relative to the molar quantity of RPEG: the greater the molar quantity of diol (assuming that the di(ketene acetal) is present in at least an equimolar quantity), the longer is the POE block.

The triblock copolymers of formula Y are also formed in a two-step synthesis.

In the first step, an excess of the di(ketene acetal) of formula III or formula IV is reacted with a diol of the formula HO—R$^1$—OH and a diol of the formula HO—R$^4$—OH, and optionally a diol of the formula HO—R$^2$—OH and/or HO—R$^3$—OH, or a mixture thereof, to form a POE block which is terminated at each end with a di(ketene acetal) unit, giving an intermediate of formula IX or formula X:

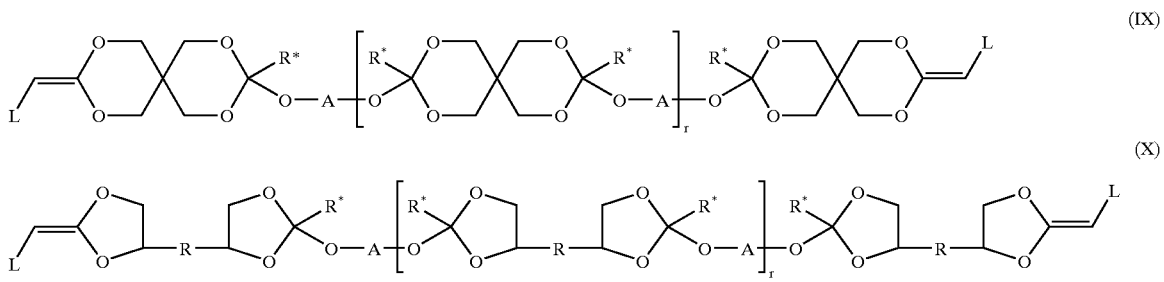

where r is g-2.

In the second step, the intermediate of formula IX or formula X is reacted with two equivalents of PEG or an RPEG to form the triblock copolymer of formula Y.

Since the di(ketene acetal) and the diol react in essentially a 1:1 ratio to form the POE block of the triblock copolymer, but di(ketene acetal) termination of the POE block is desired, the quantities of the di(ketene acetal) and the diol are chosen so that the molar amount of di(ketene acetal) is slightly greater than the molar amount of the diol. The molar ratio of PEG/RPEG to POE block should be approximately 2:1, but an excess of PEG/RPEG may be used, as it may be easily separated from the polymer after completion of the reaction.

The values of f and h for the PEG blocks are determined by the PEG/RPEG chosen. Typically f and h are the same, when a single PEG/RPEG is used; but if two or more PEGs/RPEGs of different lengths are used, then mixtures of copolymers containing varying PEG block lengths can be obtained, and these mixtures may be separated if desired, by such molecular weight fractionation techniques as gel permeation chromatography. The value of g for the POE block is determined primarily by the ratio of the di(ketene acetal) to the diol used to form the POE.

The triblock copolymers of formula Z are also formed in a two-step synthesis.

In the first step, a PEG of the formula H—[OCH$_2$-CH$_2$]$_h$—OH is reacted with an excess of a di(ketene acetal) of formula III or formula IV to form an intermediate of formula XI or formula XII:

chosen so that the molar amount of di(ketene acetal) is equal to the sum of the molar amounts of the PEG and the diol.

The value of h for the PEG block is determined by the PEG chosen. The values of g and j for the POE blocks are determined by the molar quantity of diol relative to the molar quantity of PEG: the greater the molar quantity of diol (assuming that the di(ketene acetal) is present in at least an equimolar quantity), the longer are the POE blocks. Typically the POE blocks will be of equal lengths, on average.

In an alternative synthesis of the triblock copolymer of formula Z, POE blocks terminated with di(ketene acetal) units (intermediates of formula IX and formula X) are prepared, and reacted with 0.5 molar equivalent of PEG to terminate each end of the PEG with the POE blocks.

In any of the syntheses in which the copolymers may have an unreacted di(ketene acetal) terminal group, the copolymer may be reacted with a hydroxy-containing compound, such as a $C_1$–$C_4$ alcohol, to terminate the copolymer with alkoxy units; and such alkoxy-terminated copolymers are included within the scope of the invention. The hydroxy-containing compound, especially a $C_1$–$C_4$ alcohol, may be employed in excess and the unreacted excess easily separated during purification of the polymer.

Suitable reaction conditions for the formation of the copolymers are those conditions well known for the formation of poly(ortho esters), such as are described in U.S. Pat. No. 5,968,543 and the other documents cited in the Background of the invention. Typically, the reaction takes place in a polar aprotic solvent, especially tetrahydrofuran. A catalyst may be used if desired or necessary, and may be

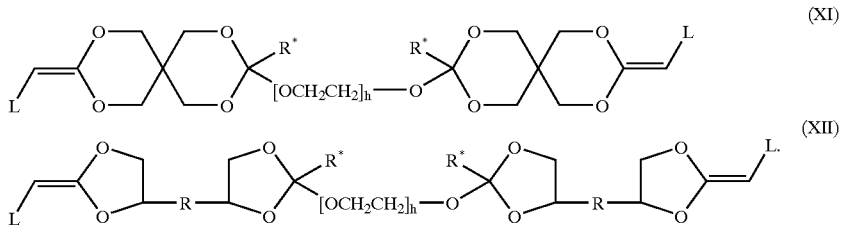

In the second step, a diol of the formula HO—R$^1$—OH and a diol of the formula HO—R$^4$—OH, and optionally a diol of the formulae HO—R$^2$—OH and/or HO—R$^3$—OH, or a mixture thereof, is reacted with the solution of the first step (containing the intermediate of formula XI or formula XII and the excess di(ketene acetal)) to extend the POE blocks, thereby forming the triblock copolymer of formula Z.

Since the di(ketene acetal) and the diol react in a 1:1 ratio to form the POE blocks of the diblock copolymer, the quantities of the PEG, the di(ketene acetal), and the diol are selected from those catalysts known to the art for the formation of orthoesters. Suitable such catalysts include iodine/pyridine, strong acids such as p-toluenesulfonic acid; Lewis acids, such as boron trichloride etherate, boron trifluoride etherate, tin oxychloride, phosphorus oxychloride, zinc chloride, phosphorus pentafluoride, antimony pentafluoride, stannic chloride, and the like; and Bronsted acids, such as polyphosphoric acid, polystyrenesulfonic acid, and the like. A particularly suitable catalyst is p-toluenesulfonic acid. A typical amount of catalyst used is about 0.2% by weight relative to the diketene acetal, though quantities between 0.005% and 2% may be used.

Suitable reaction temperatures are from room temperature to the boiling point of the solvent used, for example, between 20° C. and 70° C.; and suitable reaction times are between a few minutes and 48 hours, typically between 15 minutes and 24 hours.

Once the formation of the block copolymer is complete, the copolymer can be isolated by precipitation in a non-polar aprotic solvent such as hexane. Typically, the reaction mixture containing the copolymer (which may be cooled before the addition) is added slowly to about ten volumes of the rapidly stirred solvent at room temperature. The precipitated block copolymer may be collected by filtration, decantation, or other suitable method, washed to remove unreacted monomers or other contaminants, and dried, typically in a vacuum oven at a temperature below its melting point.

Uses of the Block Copolymers

While the block copolymers of this invention will find utility in any of the uses for which biodegradable polymers are useful, including such uses as vehicles for the sustained release of active agents, orthopedic implants, degradable sutures, and the like, they will also find particular utility in applications where their nature as block copolymers having both hydrophobic and hydrophilic blocks confers a special benefit, and these uses will be addressed in greater detail, since a person of ordinary skill in the art will be well acquainted with the uses of biodegradable polymers and will have no difficulty, having regard to the skill of the art and this disclosure, in adapting the block copolymers of this invention to such uses.

Micellar System for Targeting of Tissues with EPR (Tumors and Inflamed Tissues)

Polymers useful as micellar delivery systems can be prepared by forming diblock, AB, or triblock, ABA or BAB, copolymers comprising a hydrophilic poly(ethylene glycol) A block and a hydrophobic poly(ortho ester) B block.

When such block copolymers are placed in water, in which the poly(ethylene glycol) block is soluble and the poly(ortho ester) block is insoluble, the block copolymer chains will spontaneously self-aggregate to form micellar structures. The hydrodynamic diameter of such micelles, which may be determined by methods such as dynamic light scattering, will be in the order of 10–30 nm. As may be determined by methods such as static light scattering, such micelles will contain several hundred polymer chains. The micelles will undergo a secondary, reversible association, giving particles of an average diameter of about 100 nm. While such micelles are too large to be excreted by the kidneys, individual block copolymers are not. Further, since the poly(ortho ester) segments can be made to be biodegradable, facile renal excretion will take place.

The major utility of such micellar systems resides in their ability to entrap and solubilize hydrophobic drugs in the hydrophobic core. Such entrapment is easily carried out in a number of ways. Thus, the drug can be added to the aqueous solution containing micelles and incorporated by simple stirring, by heating to moderate temperatures, or by ultrasonication. The micelles are efficient carriers for a variety of hydrophobic or insoluble active agents, and are particularly suitable as carriers for anticancer agents, which will accumulate in the tumor by an endocytotic process.

Efficient entrapment of hydrophobic drugs requires a highly hydrophobic core. Using AB, ABA, or BAB block copolymers where the hydrophobic B block forms a biodegradable, highly hydrophobic poly(ortho ester) core will allow preparation of systems with significantly enhanced entrapment efficiency relative to other biodegradable segments such as poly(L-lactic-co-glycolic acid) copolymers.

While any of the anticancer agents that can form micellar complexes are suitable for this use, anticancer agents that are particularly suitable for micellar tumor targeting are those with low water solubility or high aromatic content, such as the anthracycline antibiotics (e.g. doxorubicin, daunorubicin, and epirubicin), mitomycin C, paclitaxel and its analogs (e.g. docetaxol), platinum analogs (e.g. cisplatin and carboplatin), and the like. Other agents may include anticancer proteins, such as neocarzinostatin, L-asparaginase, and the like, and photosensitizers used in photodynatic therapy. Similarly, while any of the anti-inflammatory agents that can form micellar complexes are suitable for this use, anti-inflammatory agents that are particularly suitable for micellar targeting are those with low water solubility or high aromatic content, such as the anti-inflammatory steroids (e.g., cortisone, hydrocortisone, dexamethasone, prednisone, prednisolone, beclomethasone, betamethasone, flunisolide, fluocinolone acetonide, fluocinonide, triamcinolone, and the like) and the non-ionized NSAIDs (e.g., naproxen, nabumetone, ketoprofen, mefenamic acid, fenbufen, piroxicam, meloxicam, celecoxib, rofecoxib, and the like).

Bioerodible Block Copolymer Matrix for Controlled Drug Delivery

In the block copolymers of this invention, phase separation will occur where domains of the B block form within the continuous A-phase or vice versa. Such phase-separated material will have unique and useful thermal properties. Specifically, unlike poly(ortho esters) containing short segments of PEG within the poly(ortho ester), which when heated will gradually soften, PEG/POE AB, ABA, or BAB block copolymers have relatively sharp melting points. Further, while poly(ortho esters) containing short segments of poly(ethylene glycol) that have low softening temperatures have very poor mechanical properties, the copolymers of this invention, even those having very low melting temperatures, will retain mechanical properties suitable for use as implants.

The present block copolymers can be used for any use in which bioerodible polymers are usable, such as vehicles for the sustained release of an active agent.

To use the block copolymer as a sustained-release vehicle or carrier, the active agent must be incorporated into a matrix of the block copolymer or encapsulated within a capsule (or a "microcapsule" or "nanocapsule", as those terms are sometimes used) of the block copolymer. Methods for the preparation of sustained-release dosage forms using biodegradable polymers are well known in the art, as discussed in the references cited in the "Description of the related art" section of this application, and in other references familiar to those of ordinary skill in the art; so that a person of ordinary skill in the art would have no difficulty, having regard to that skill and this disclosure, in preparing sustained-release formulations using the block copolymer of this invention. Suitable active agents include therapeutic agents such as pharmaceutical or pharmacological active agents, e.g. drugs and medicaments, as well as prophylactic agents, diagnostic agents, and other chemicals or materials useful in preventing or treating disease. The compositions of this invention are particularly useful for the therapeutic treatment of humans and other mammals, but may also be used for other animals. In addition, the sustained-release compositions of this invention may also be used for the release of cosmetic and agricultural agents, or for the release of biocides, such as fungicides or other pesticides, into an environment where prolonged release of the active agent is desired.

In the case of matrix formulations, the block copolymer is first mixed with the active agent. High homogeneity may be achieved by mixing the block copolymer in its heat softened state with the active agent, followed by lowering the temperature to harden the composition. Alternatively, the block copolymer can be dissolved in an appropriate casting solvent, such as tetrahydrofuran, methylene chloride, chloroform or ethyl acetate, and the active agent can then be dispersed or dissolved in the block copolymer solution, followed by evaporating the solvent to achieve the finished composition. Another method is grinding a solid block copolymer material into powder which is then mixed with a powdered active agent. The active agent may also be incorporated into the mixture of monomers before polymerization provided that it is stable under the polymerization conditions and does not interfere with the polymerization reaction.

If the active agent is one that is unstable at elevated temperatures (e.g. above 40° C.), or in the presence of organic solvents or organic solvent/water mixtures, such as a protein, then special preparation techniques may be required to minimize the exposure of the active agent to damaging conditions. Such techniques are disclosed in, for example, U.S. Pat. No. 5,620,697, which discloses ultrasonic melting to form matrix-type pharmaceutical compositions, and U.S. Pat. No. 5,518,730, which discloses melt-spinning, both of which techniques are designed to minimize the exposure of the polymer and active to elevated temperatures. Other methods are disclosed in the patents and literature references cited elsewhere in this application.

An alternate method for the incorporation and release of sensitive therapeutic agents is to use bioerodible poly(ortho esters) that have physical properties tailored for this incorporation. For example, the block copolymer may be chosen so that it is semi-solid and has an ointment-like consistency, rather than being fully solid. Thus, a block copolymer may be chosen that has a very high viscosity at normal body temperature of 37° C. so that little if any deformation takes place at that temperature. However, the viscosity of the block copolymer may decrease substantially at temperatures no higher than 45° C., or preferably by 40° C., so that injection of the material may be possible at a temperature at which the active agent retains its activity.

The composition obtained from any of the above methods can be readily processed into a variety of shapes and forms for implantation, insertion or placement on the body or into body cavities or passageways. For example, the block copolymer composition may be injection molded, extruded or compressed into a thin film or made into devices of various geometric shapes or forms such as flat, square, round, cylindrical, tubular, disc, ring and the like. Rod- or pellet-shaped devices may be implanted through a trocar, such as is known for Norplant® implants, and these or other shapes may be implanted by minor surgical procedures. Alternatively, a device may be implanted following a major surgical procedure such as tumor removal in the surgical treatment of cancer. The implantation of polymer wafers containing anticancer agents is described, for example, in U.S. Pat. Nos. 5,626,862 and 5,651,986, and references cited therein; and the poly(ortho esters) of this invention will find utility in such applications.

The block copolymer composition may also be injected by syringe subcutaneously or intramuscularly as particles of 0.1 $\mu$m to 1000 $\mu$m, preferably 0.5 $\mu$m to 200 $\mu$m, and more preferably 1 $\mu$m to 150 $\mu$m suspended in a pharmaceutically acceptable injection base. Liquid vehicles useful for suspending the drug-block copolymer composition for injection include isotonic saline solution or oils (such as corn oil, cottonseed oil, peanut oil and sesame oil) which, if desired, may contain other adjuvants.

Another injectable dosage form may be prepared from an active agent mixed in a block copolymer of the present invention which has an semi-solid consistency or which, when mixed with a suitable liquid excipient, forms a semi-solid composition such as the compositions described in U.S. patent application Ser. No. 09/854,180 (International Publication No. WO 01/85139). Such a dosage form may be administered by injection. Such a dosage form may also be administered by direct application to an area to be treated, such as by spreading into a wound with a spatula.

The block copolymer composition administered by either injection or implantation undergoes bioerosion in the body into non-toxic and non-reactive materials. By controlling the number of hydrolysable bonds in the block copolymer, the active agent may be released at a desired rate. Implants prepared from the present block copolymers in which the block copolymer constitutes the matrix containing an active agent also have the advantage that they do not require removal because of the bioerodibility of the block copolymer.

In some cases, particles with cores of the pure active agent coated with various thicknesses of the present block copolymer may be preferred for sustained delivery of the active agent. Coating or encapsulation of discrete particles of the active agent may be accomplished by conventional methods which are all well-known to the person skilled in the art. For example, finely divided drug particles may be suspended in a solvent system (in which the drug is not soluble) containing the dissolved block copolymer and other excipients, followed by spray drying. Alternatively, the drug particles may be placed in a rotating pan or a fluid-bed dryer and the block copolymer dissolved in a carrier solvent is sprayed onto the drug particles until a suitable coating quantity is deposited on the particles to give a desired thickness. The coating may also be achieved by suspending the drug particles in a solvent system containing the dissolved block copolymer followed by adding to the suspension a non-solvent causing the block copolymer to precipitate and form a coating over the drug particles.

For the sustained release compositions, because the active agent will be released over a controlled period of time, the agent usually is present in an amount which is greater than the conventional single dose. The relative proportions of the active agent and the block copolymer can vary over a wide range (e.g., 0.1–50 wt. %) depending on the therapeutic agent and the desired effect.

Sustained compositions of cosmetic and agricultural agents may also be prepared by any one of the methods as described above, using the block copolymers of the present invention.

The solid block copolymers are also useful for a variety of orthopedic applications. For example, they can be used as fracture fixation devices for repair of osteochondral defects, ligament and tendon reconstructions and bone substitutes. In addition, the fact that the present block copolymers permit simultaneous selection of both a desired level of their mechano-physical state and a desired rate of bioerodibility, also renders them attractive as grafts or scaffolds on which cells can be cultured in vitro prior to implantation to regenerate tissues. Tissues which can be regenerated using this approach include but not limited to, bone, tendon, cartilage, ligaments, liver, intestine, ureter and skin tissues.

For example, the block copolymers may be used to regenerate skin for patients with burns or skin ulcers. Cartilages may be repaired by first isolating chondrocytes from a patient (or a donor), allowing them to proliferate on the scaffolds prepared from the present block copolymers and re-implanting the cells in the patient.

The block copolymer scaffolds or implants may further contain other biologically active substances or synthetic inorganic materials such as reinforcing filler material for enhancing the mechanical properties of the scaffolds or implants (e.g. calcium sodium metaphosphate fibers), antibiotics or bone growth factors to induce and/or promote orthopedic restoration and tissue regeneration.

The copolymer composition administered by either injection or implantation undergoes bioerosion in the body into non-toxic and non-reactive materials. By controlling the number of hydrolysable bonds in the polymer, the active agent may be released at a desired rate. Implants prepared from the present copolymers in which the copolymer constitutes the matrix containing an active agent also have the advantage that they do not require removal because of the bioerodibility of the copolymer.

The compositions are also stable. The release rates of the active agent are not affected by irradiation for sterilization.

Particular Compositions and Their Uses

Exemplary compositions of this invention, and their uses, include:

(1) compositions containing local anesthetics, optionally in combination with glucocorticosteroids such as dexamethasone, cortisone, hydrocortisone, prednisone, prednisolone, beclomethasone, betamethasone, flunisolide, fluocinolone acetonide, fluocinonide, triamcinolone, and the like, for the prolonged relief of local pain or a prolonged nerve blockade;

(2) compositions containing cancer chemotherapeutic agents, such as those listed above under "Active agents", for deposition by syringe or by injection into tumors or operative sites from which a tumor has been ablated, for tumor control or treatment and/or the suppression of regrowth of the tumor from residual tumor cells after ablation of the tumor;

(3) compositions containing progestogens, such as flurogestone, medroxyprogesterone, norgestrel, norgestimate, norethindrone, and the like, for estrus synchronization or contraception;

(4) compositions containing antimetabolites such as fluorouracil and the like, as an adjunct to glaucoma filtering surgery; compositions containing antiangiogenic agents such as combrestatin, contortrostatin, and anti-VEGF agents, for the treatment of macular degeneration and retinal angiogenesis; and other compositions for the controlled release of ophthalmic drugs to the eye;

(5) compositions containing therapeutic polypeptides (proteins), such as insulin, luteinizing hormone releasing factor antagonists, and the like, for the controlled delivery of these polypeptides, avoiding the need for daily or other frequent injection;

(6) compositions containing anti-inflammatory agents such as the NSAIDs, e.g., ibuprofen, naproxen, COX-1 or COX-2 inhibitors, and the like, or anti-inflammatory steroids, for deposition by injection into inflamed tissue or intra-articular injection;

(7) compositions containing antibiotics, for the prevention or treatment of infection, especially for deposition into surgical sites to suppress post-operative infection, or into or on wounds, for the suppression of infection (e.g. from foreign bodies in the wound);

(8) compositions containing morphogenic proteins such as bone morphogenic protein; and (9) compositions containing DNA or other polynucleotides, such as antisense oligonucleotides.

Delivery of Controlled-release Local Anesthetics by Injection

Local anesthetics induce a temporary nerve conduction block and provide pain relief which lasts from a few minutes to a few hours. They are frequently used to prevent pain in surgical procedures, dental manipulations or injuries.

The synthetic local anesthetics may be divided into two groups: the slightly soluble compounds and the soluble compounds. Conventionally, the soluble local anesthetics can be applied topically and by injection, and the slightly soluble local anesthetics are used only for surface application. The local anesthetics conventionally administered by injection can also be divided into two groups, esters and non-esters. The esters include (1) benzoic acid esters (piperocaine, meprylcaine and isobucaine); (2) p-aminobenzoic acid esters (procaine, tetracaine, butethamine, propoxycaine, chloroprocaine); (3) m-aminobenzoic acid esters (metabutethamine, primacaine); and (4) p-ethoxybenzoic acid esters (parethoxycaine). The non-esters are largely anilides (amides), and include bupivacaine, lidocaine, mepivacaine, pyrrocaine and prilocalne.

Many of the local anesthetics are conventionally used in the form of their acid addition salts, as this provides solubility in aqueous injection media. However, because the presence of the large amount of acid within such a local anesthetic acid addition salt will result in more rapid degradation of the poly(ortho esters) or block copolymers of this invention and release of the local anesthetic, it is generally desirable to use the local anesthetics in free base form, or with only a small proportion of the acid addition salt present (addition of small quantities of the acid addition salt may provide enhanced release if desired).

The semi-solid injectable form of a local anesthetic of the present invention is prepared by incorporating the local anesthetic into the delivery vehicle in a manner as described above. The concentration of the local anesthetic may vary from 1–60 wt. %, preferably 5–30 wt. %, e.g., about 10 wt. %. The semi-solid composition is then filled into a syringe with a 18–25 gauge needle, and injected into sites that are painful or to be subjected to surgical procedures. The semi-solid injectable composition of the present invention can be used for controlled delivery of both slightly soluble and soluble local anesthetics.

Because the duration of action of a local anesthetic is proportional to the time during which it is in actual contact with nervous tissues, the present injectable delivery system can maintain localization of the anesthetic at the nerve for an extended period of time which will greatly prolong the effect of the anesthetic.

A number of authors, including in U.S. Pat. No. 6,046,187 and related patents, have suggested that the co-administration of a glucocorticosteroid may prolong or otherwise enhance the effect of local anesthetics, especially controlled-release local anesthetics; and formulations containing a local anesthetic and a glucocorticosteroid, and their uses for controlled release local anesthesia, are within the scope of this invention.

EXAMPLES

The following syntheses illustrate the preparation of block copolymers of this invention.

Example 1

Preparation of a Diblock Copolymer of Formula X

Under anhydrous conditions, 20 g (10 mmol) PEG 2000 mono-methyl ether (MPEG 2000) and 21.23 g (100 mmol)

DETOSU are weighed into a 250 mL flask and dissolved in 40 mL THF. A solution of p-toluenesulfonic acid in THF (0.05 mL, 20 mg/mL) is added to the MPEG 2000/DETOSU solution to initiate the reaction between the MPEG 2000 and the DETOSU, and the reaction mixture is stirred for about 20 minutes. CDM (13.20 g, 91.5 mmol), 0.375 g (2.5 mmol) MDEA, and 0.213 g (1 mmol) TEG-mGL in 40 mL tetrahydrofuran are added to the flask, followed by another 0.05 mL of the p-toluenesulfonic acid solution. The reaction mixture is stirred for about 30 minutes, and then added dropwise to about 1 L of hexane with vigorous stirring, precipitating the diblock copolymer product, which is separated by filtration and dried in a vacuum oven.

Example 2

Preparation of a Triblock Copolymer of Formula Z

Under anhydrous conditions, 15 g (15 mmol) PEG 1000 and 21.23 g (100 mmol) DETOSU are weighed into a 250 mL flask and dissolved in 40 mL THF. A solution of p-toluenesulfonic acid in THF (0.05 mL, 20 mg/mL) is added to the PEG 1000/DETOSU solution to initiate the reaction between the PEG 1000 and the DETOSU, and the reaction mixture is stirred for about 20 minutes. CDM (11.52 g, 79.9 mmol), 0.750 g (5.0 mmol) MDEA, and 0.226 g (0.85 nmmol) TEG-mGL in 40 mL tetrahydrofuran are added to the flask, followed by another 0.05 mL of the p-toluenesulfonic acid solution. The reaction mixture is stirred for about 30 minutes, and then added dropwise to about 1 L of hexane with vigorous stirring, precipitating the triblock copolymer product, which is separated by filtration and dried in a vacuum oven, giving a triblock POE-PEG-POE copolymer.

Other copolymers of formula X, Y, and Z are similarly prepared.

The foregoing is offered primarily for purposes of illustration. It will be readily apparent to those skilled in the art that the molecular structures, proportions of the reactant materials, methods of use and other parameters of the invention described herein may be further modified or substituted in various ways without departing from the spirit and scope of the invention.

What is claimed is:

1. A micellar pharmaceutical composition for the delivery of a hydrophobic or water-insoluble active agent, comprising the active agent physically entrapped within but not covalently bonded to a drug carrier comprising a block copolymer of formula X, formula Y, or formula Z:

$$R^A-[OCH_2CH_2]_f-[POE]_g-H \quad (X),$$

$$R^A-[OCH_2CH_2]_f-[POE]_g-[OCH_2CH_2]_h-OR^B \quad (Y),$$

$$H-A-[POE]_g-[OCH_2CH_2]_h-[POE]_j-H \quad (Z),$$

where:

$R^A$ is $C_1-C_4$ alkyl;

$R^B$ is $C_1-C_4$ alkyl;

f and h are independently an integer from 2 to 1000;

g and j are independently an integer from 2 to 200;

POE is a poly(ortho ester) unit of formula IA or formula IIA:

(IA)

(IIA)

where $R^*$ is a $C_1-C_4$ alkyl;

R is a bond, $-(CH_2)_a-$, or $-(CH_2)_b-O-(CH_2)_c-$; where a is an integer of 1 to 10, and b and c are independently integers of 1 to 5; and each A is independently selected from $R^1$, $R^2$, $R^3$, and $R^4$, where $R^1$ is:

where:

p is an integer of 1 to 20;

$R^5$ is hydrogen or $C_1-C_4$ alkyl; and $R^6$ is:

where:

s is an integer of 0 to 30;

t is an integer of 2 to 200; and $R^7$ is hydrogen or $C_1-C_4$ alkyl;

$R^2$ is:

-continued

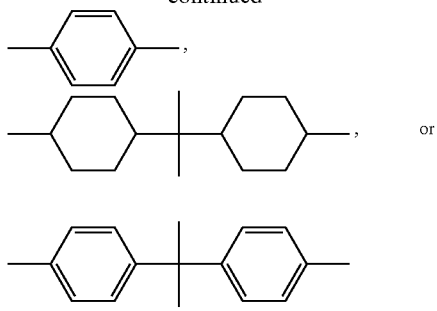

$R^3$ is:

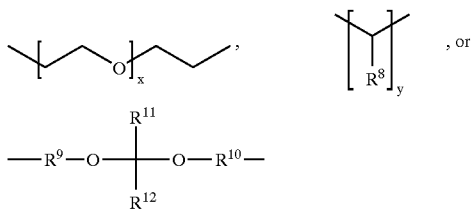

where:
x is an integer of 0 to 30;
y is an integer of 2 to 200;
$R^8$ is hydrogen or $C_1$–$C_4$ alkyl;
$R^9$ and $R^{10}$ are independently $C_1$–$C_{12}$ alkylene;
$R^{11}$ is hydrogen or $C_1$–$C_6$ alkyl and $R^{12}$ is $C_1$–$C_6$ alkyl; or $R^{11}$ and $R^{12}$ together are $C_3$–$C_{10}$ alkylene; and
$R^4$ is the residue of a diol containing at least one amine functionality incorporated therein;
in which at least 0.1 mol % of the A units are $R^1$, and at least 0.1 mol % of the A units are $R^4$.

2. The pharmaceutical composition of claim 1 where the fraction of the active agent is from 1% to 60% by weight of the composition.

3. The pharmaceutical composition of claim 2 where the fraction of the active agent is from 5% to 30% by weight of the composition.

4. The pharmaceutical composition of claim 1 where the active agent is selected from anti-infectives, antiseptics, steroids, therapeutic polypeptides, anti-inflammatory agents, cancer chemotherapeutic agents, narcotics, local anesthetics, antiangiogenic agents, vaccines, antigens, DNA, and antisense oligonucleotides.

5. The pharmaceutical composition of claim 1 where the active agent is a cancer chemotherapeutic agent.

6. The pharmaceutical composition of claim 1 where the active agent is an anti-inflammatory agent.

7. A method of treating a disease state treatable by controlled release local administration of an active agent, comprising locally administering a therapeutically effective amount of the active agent in the form of a pharmaceutical composition of claim 1.

8. A composition for the sustained release of an active agent, comprising the active agent dispersed in a matrix comprising a block copolymer of formula X, formula Y, or formula Z:

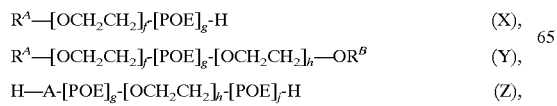

where:
$R^A$ is $C_1$–$C_4$ alkyl;
$R^B$ is $C_1$–$C_4$ alkyl;
f and h are independently an integer from 2 to 1000;
g and j are independently an integer from 2 to 200;
POE is a poly(ortho ester) unit of formula IA or formula IIA:

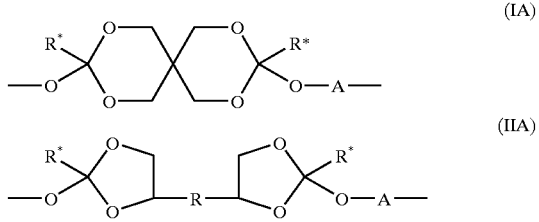

where
$R^*$ is a $C_1$–$C_4$ alkyl;
R is a bond, —$(CH_2)_a$—, or —$(CH_2)_b$—O—$(CH_2)_c$—; where a is an integer of 1 to 10, and b and c are independently integers of 1 to 5; and
each A is independently selected from $R^1$, $R^2$, $R^3$, and $R^4$, where $R^1$ is:

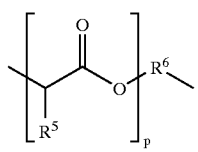

where:
p is an integer of 1 to 20;
$R^5$ is hydrogen or $C_1$–$C_4$ alkyl; and
$R^6$ is:

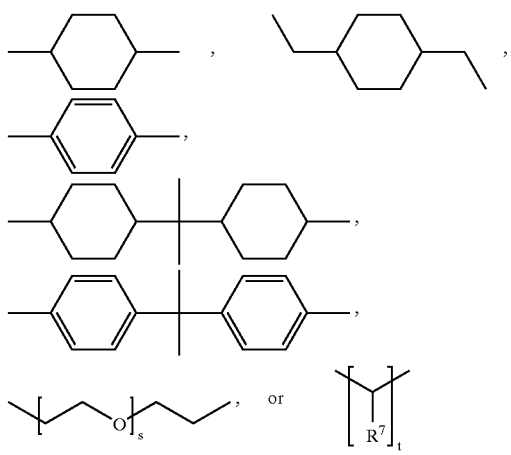

where:
s is an integer of 0 to 30;
t is an integer of 2 to 200; and
$R^7$ is hydrogen or $C_1$–$C_4$ alkyl;

$R^2$ is:

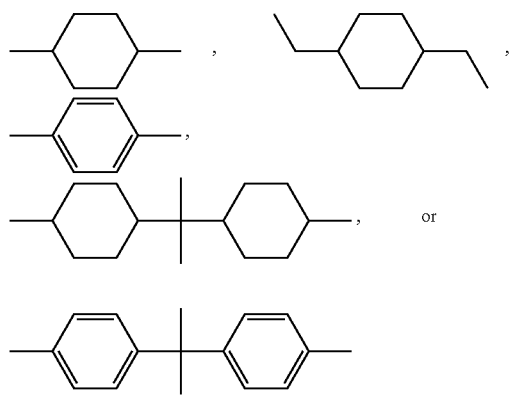

$R^3$ is:

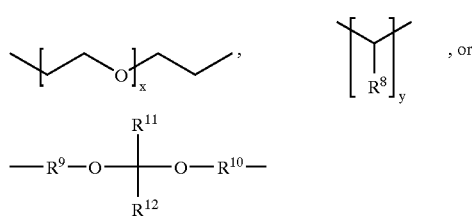

where:
x is an integer of 0 to 30;
y is an integer of 2 to 200;
$R^8$ is hydrogen or $C_1$–$C_4$ alkyl;
$R^9$ and $R^{10}$ are independently $C_1$–$C_{12}$ alkylene;
$R^{11}$ is hydrogen or $C_1$–$C_6$ alkyl and $R^{12}$ is $C_1$–$C_6$ alkyl; or $R^{11}$ and $R^{12}$ together are $C_3$–$C_{10}$ alkylene; and
$R^4$ is the residue of a diol containing at least one amine functionality incorporated therein;
in which at least 0.1 mol % of the A units are $R^1$, and at least 0.1 mol % of the A units are $R^4$.

9. The pharmaceutical composition of claim 8 where the fraction of the active agent is from 1% to 60% by weight of the composition.

10. The pharmaceutical composition of claim 9 where the fraction of the active agent is from 5% to 30% by weight of the composition.

11. The pharmaceutical composition of claim 8 where the active agent is selected from anti-infectives, antiseptics, steroids, therapeutic polypeptides, anti-inflammatory agents, cancer chemotherapeutic agents, narcotics, local anesthetics, antiangiogenic agents, vaccines, antigens, DNA, and antisense oligonucleotides.

12. The pharmaceutical composition of claim 8 where the active agent is a local anesthetic.

13. The pharmaceutical composition of claim 12 further comprising a glucocorticosteroid.

14. A method of treating a disease state treatable by controlled release local administration of an active agent, comprising locally administering a therapeutically effective amount of the active agent in the form of a pharmaceutical composition of claim 8.

15. A method of preventing or relieving local pain at a site in a mammal, comprising administering to the site a therapeutically effective amount of a local anesthetic in the form of a pharmaceutically acceptable composition of claim 12.

16. A device for orthopedic restoration or tissue regeneration comprising a block copolymer of formula X, formula Y, or formula Z:

where:
$R^A$ is $C_1$–$C_4$ alkyl;
$R^B$ is $C_1$–$C_4$ alkyl;
f and h are independently an integer from 2 to 1000;
g and j are independently an integer from 2 to 200;
POE is a poly(ortho ester) unit of formula IA or formula IIA:

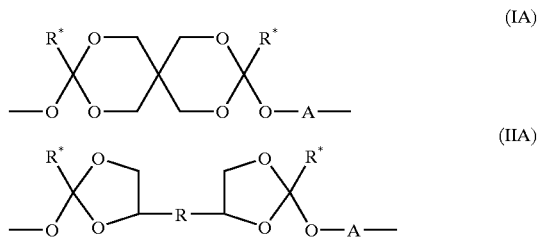

where
$R^*$ is a $C_1$–$C_4$ alkyl;
R is a bond, —($CH_2$)—, or —($CH_2$)$_b$—O—($CH_2$)$_c$—; where a is an integer of 1 to 10, and b and c are independently integers of 1 to 5; and
each A is independently selected from $R^1$, $R^2$, $R^3$, and $R^4$, where $R^1$ is:

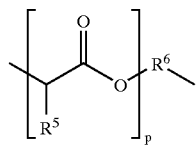

* * * * *